(12) United States Patent
Pitsos

(10) Patent No.: US 7,177,932 B2
(45) Date of Patent: Feb. 13, 2007

(54) METHOD, GATEWAY AND SYSTEM FOR TRANSMITTING DATA BETWEEN A DEVICE IN A PUBLIC NETWORK AND A DEVICE IN AN INTERNAL NETWORK

(75) Inventor: Errikos Pitsos, Florian-Geyer-Str. 10, Muenchen, 81377 (DE)

(73) Assignee: Errikos Pitsos, Munich (DE)

( * ) Notice: Subject to any disclaimer, the term of this patent is extended or adjusted under 35 U.S.C. 154(b) by 591 days.

(21) Appl. No.: 10/278,029

(22) Filed: Oct. 23, 2002

(65) Prior Publication Data

US 2004/0054792 A1  Mar. 18, 2004

(51) Int. Cl.
*G06F 15/16*  (2006.01)
*H04L 9/00*  (2006.01)

(52) U.S. Cl. .................... 709/225; 380/282
(58) Field of Classification Search ............. None
See application file for complete search history.

(56) References Cited

U.S. PATENT DOCUMENTS

| | | | |
|---|---|---|---|
| 5,511,122 A * | 4/1996 | Atkinson | ............ 713/153 |
| 6,055,236 A | 4/2000 | Nessett et al. | |
| 6,131,120 A | 10/2000 | Reid | |
| 6,154,839 A | 11/2000 | Arrow et al. | |
| 6,671,729 B1 | 12/2003 | Gordon et al. | |
| 2002/0013848 A1 | 1/2002 | Salle | |
| 2003/0065947 A1 * | 4/2003 | Song et al. | ............ 713/201 |
| 2003/0181843 A1 | 9/2003 | Balissat et al. | |
| 2003/0191937 A1 * | 10/2003 | Balissat et al. | ............ 713/163 |
| 2004/0015723 A1 | 1/2004 | Pham et al. | |

FOREIGN PATENT DOCUMENTS

EP  1 035 702 A2  9/2000

OTHER PUBLICATIONS

Francis et al., IPNL: A NAT-Extended Internet Architecture, Sigcomm, Aug. 2001, pp. 67-7.
European Search Report dated Dec. 30, 2002, issued for European Patent Application No. 02019486.6 (3 pages).

* cited by examiner

*Primary Examiner*—John Follansbee
*Assistant Examiner*—Ashok Patel
(74) *Attorney, Agent, or Firm*—Marc S. Kaufman; Nixon Peabody, LLP

(57) ABSTRACT

A gateway for connecting a public network to an internal network is provided. The gateway comprises a control unit for controlling transmission of incoming and/or outgoing data between a remote device in the public network and an internal device in the internal network; a public port connected to the public network; an internal port connected to the internal network; and a storage unit storing a list of public key identifiers and respectively associated internal network addresses of internal devices; wherein the control unit is adapted for identifying a destination of the incoming data, which are addressed to a public network address of the gateway, by determining an internal network address of the internal device based on public key information included in the incoming data and the list of public key identifiers and associated internal network addresses.

23 Claims, 5 Drawing Sheets

| temporary assigned port (61) | remote device (62) | internal device (63) | ... |
|---|---|---|---|
| P1 | RD1 | iadr_A | |
| P2 | RD1 | iadr_C | |

Fig. 6

| User-ID (51) | PK-ID (52) | ... |
|---|---|---|
| Alpha | A_ID | |
| Beta | B_ID | |
| ⋮ | | |

Fig. 7

| Gateway-ID (81) | Gateway-IP address (82) | PK-Gateway (83) |
|---|---|---|
| G1 | IP_adr_G1 | PK_G1 |
| G2 | IP_adr_G2 | PK_G2 |

Fig. 8

| User-ID | Case | Gateway-ID |
|---|---|---|
| Alpha | 1 | G1 |
| Alpha | 2 | G2 |
| Alpha | 3 | G3 |
| Beta | 0 | G2 |

Fig. 9

| User-ID | Rule | Case |
|---|---|---|
| Alpha | (day = Sat, Son) | 1 |
| Alpha | (Sender ∈ my company) | 2 |
| Alpha | (else) | 3 |

Fig. 10

METHOD, GATEWAY AND SYSTEM FOR TRANSMITTING DATA BETWEEN A DEVICE IN A PUBLIC NETWORK AND A DEVICE IN AN INTERNAL NETWORK

BACKGROUND OF THE INVENTION

1. Field of the Invention

The present invention generally is related to data transmission via IP based public networks and particularly to data transmission via the internet to an internal device of an internal network upon using asymmetric keys.

2. Description of the Related Art

Electronic data or messages transmitted via public networks like the internet are typically encrypted in order to preserve the privacy of the transmitted information. Preferably, public key systems are used in this regard. By encrypting the transmitted information with the public key of a destination device, it can be guaranteed that only the destination device, which securely stores the corresponding private key, can decrypt the transmitted information by means of the private key.

In the internet the public key of a user may be provided by means of a public key server. The public key server stores the public key of the user and for example a certificate of the public key, which is issued for the public key by a trusted third party. Accordingly, a sender of a message to the user may request the user's public key or the corresponding certificate, for checking the validity of the public key, from the public key server. Public key servers, certification authorities and further components provide a system also referred to as a public key infrastructure (PKI).

For transmitting information over the internet the sender further needs the unique IP address of the destination. The number of world wide IP addresses however is limited and becomes a scarce resource due to the rising number of participants in the internet. Moreover, a user publishing his IP address becomes open to a variety of possible attacks.

As a consequence, IP addresses are usually not published, but exchanged upon request only. Thereby the number of steps for establishing a secure communication path via the internet increases significantly. For example, when using temporarily assigned IP addresses, such IP addresses initially have to be communicated and administered, then validated for a secure communication and finally prevented from being hijacked by third parties.

EP 1 035 702 A2 discloses a system for secure communication between a mobile host and a device within an internal network, which prevents the hijacking of IP addresses. A gateway, having a secure port coupling the gateway to a secure network and an insecure port coupling the gateway to an insecure or public network, provides a list of secure IP addresses for use on the public network. The IP address of the mobile host is assigned to a "secured address". Data packets received in the gateway are analysed, if they are received from a secured address. The gateway then transmits the received data to the destination address with the secured address as a sender's address. Accordingly, the potentially insecure IP address of the sender is neither known nor used within the secure network.

SUMMARY OF THE INVENTION

It is the object of the present invention to provide a gateway, a public key server, a system as well as a method for transmitting data between a remote device in a public network and an internal device in an internal network, which are particularly improved with regard to the number of required world wide IP addresses.

This object is achieved by the subject matters of the independent claims. Preferred embodiments of the invention are described in the dependent claims.

It is a first aspect of the present invention that the number of IP addresses may be reduced when using a gateway forwarding data to an internal device based on a public key information included in the transmitted data for identifying the internal device. As a further aspect of the present invention the process of establishing a secure communication path is improved by storing the gateway address together with public keys or certificates thereof in a public key server and providing the stored information upon request.

According to the present invention, a gateway for connecting a public network to an internal network comprises a control unit for controlling a transmission of incoming and/or outgoing data between a remote device and the public network and an internal device and the internal network. Furthermore, the gateway comprises a public port connected to the public network and an internal port connected to the internal network as well as storage units storing a list of public key identifiers and respectively associated internal network addresses of internal devices. Moreover, the control unit is adapted for identifying a destination of the incoming data, which are addressed to a public network address of the gateway, by determining an internal network address of the internal device based on public key information included in the incoming data and the list of public key identifiers and associated internal network addresses.

In a corresponding method for transmitting incoming and/or outgoing data, the method performed in the gateway of the internal device comprises the steps of: receiving data transmitted between the remote device and the gateway of the internal device, forwarding the incoming data to the internal device, storing a list of public key identifiers and associated internal network addresses and identifying a destination of the incoming data which are addressed to public network address of gateway, by determining an internal network address of the internal device based on public key information included in the incoming data and the stored list of public key identifiers and associated internal network addresses.

Hence, for a plurality of devices connected to the internal network only a single IP address is required. Moreover, such a solution avoids any additional identifiers or data fields, but may use existing data fields or information of a PKI system. Finally, communication paths may be established for any remote user and not only for specifically trusted remote users, because the gateway may control or limit the transmission of data.

In an improved embodiment the gateway further comprises an encryption unit for encrypting outgoing data and/or a decryption unit for decrypting incoming data. Accordingly, independently of an encrypted or unencrypted status of the data to be transmitted to the internal device, data received or sent via the public interface port may be additionally encrypted.

It is particularly advantageous, if the gateway is further adapted to store or delete an entry in the list of public key identifiers upon request. This enables a user associated to the public key to either work at different internal devices or to even register at different gateways e.g. from day to day.

Furthermore, a system according to the invention comprises the gateway described above and a remote device addressing data intended for an internal device of the internal network of the gateway to the public network address of the gateway. Accordingly, such a system may be implemented with a common remote device by software adaptations in the remote device only.

Moreover, according to a preferred embodiment of the invention the remote device stores a plurality of gateway addresses for the destination and selects the public network address of the gateway from the list of gateway addresses in accordance with predefined first gateway determination rules. By predefining one of a plurality of gateways for a specific case, the flexibility or mobility of the user defining such rules is significantly improved.

Further according to the present invention there is provided a public key information server storing at least one public network address of a destination gateway and providing this public network address as a destination address upon request from a device in the public network. This kind of public key server significantly improves the process of establishing an encrypted communication path between devices in the public network and the internal network. The public key server may be provided within a system according to the invention, but is generally independent of implementation details of the addressed gateway.

In an advantageous embodiment of the public key server, the same is adapted to store a plurality of gateway addresses for at least one destination and selects the public network address of the gateway from the list of gateway addresses in accordance with second predefined rules. This allows the user to register his communication preferences at one central point. Moreover, the registered information may be provided selectively in accordance with the entity requesting the information.

BRIEF DESCRIPTION OF THE DRAWINGS

In the following a detailed description of embodiments for the present invention are described with reference to figures illustrating:

FIG. 6 a table storing a list of existing connections provided by a gateway;

FIG. 7 a table storing user IDs associated to public key IDs;

FIG. 8 a table storing gateway IDs and corresponding gateway IP addresses;

FIG. 9 a table storing user IDs and associated gateway IDs for different cases; and FIG. 10 a table storing gateway determination rules for the different cases specified in the table of FIG. 9.

DETAILED DESCRIPTION OF THE PREFERRED EMBODIMENTS

Figure 1:
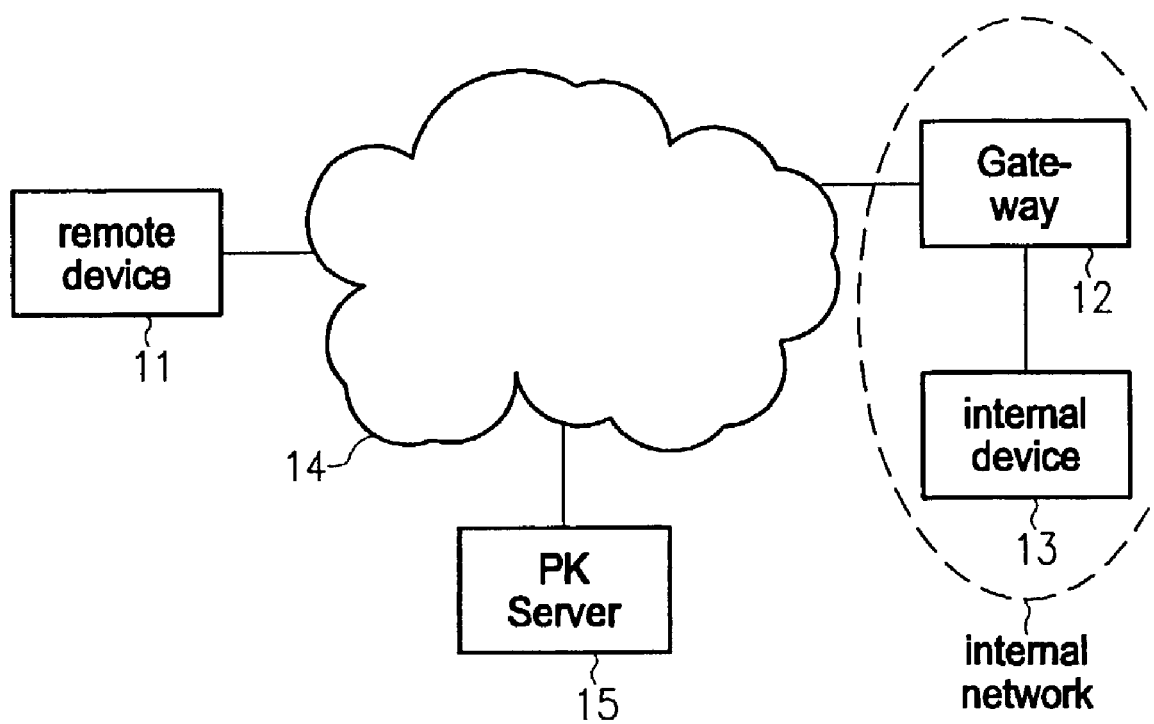
FIG. 1 a system including a gateway of an internal network, a remote device and a public key information server.

FIG. 1 illustrates a system comprising a remote device 11, a gateway 12, an internal device 13 arranged in an internal network, the internet 14 and a public key server 15. The remote device 11 is a data processing device, for example a computer, which is connected to the internet 14. Furthermore, the internal device 13 is connected to the internet 14 via the gateway 12 of the internal network.

The remote device 11 sends data to be transmitted to the internal device 13 via the internet 14 towards the gateway 12 by using the IP address of the gateway 12. The transmitted data comprise unique public key information such as a public key identifier of the internal device's public key.

The gateway 12 stores a list of public key identifiers and associated internal network addresses for identifying a destination of the incoming data which are addressed to his public network address. Accordingly, the gateway 12 determines an internal network address of the internal device 13 based on the public key information included in the incoming data as well as the stored list of public key identifiers and associated internal network addresses. Hence, the gateway 12 extracts the relevant public key information from the received data and refers to the stored list in order to determine the destination of the received data. Finally, the incoming data are forwarded to the internal device 13 by the gateway 12.

Hence, only the gateway needs a unique world wide IP address. The remote device or sender will always connect to the gateway, which forwards the connection to the destination.

It is noted that the public key may be a public key of a device or a public key of a user of this device. The transmitted data may also comprise public key information identifying the remote terminal or its user as the sender of the data. Optionally, the transmitted information may be encrypted with the public key of the internal device 13 and/or the gateway 12. The internal device 13 may be any kind of data processing device, preferably a personal computer or an information server such as an FTP server.

Furthermore, although the transmission of electronic data or messages is preferably described in the direction from the remote device to the internal device, as it is apparent for the skilled person, electronic data or messages may as well be transmitted vice versa.

Moreover, if a user of the internal device 13 is requested to communicate with a user of the remote device 11, the gateway provides a connection path for a corresponding 2-way communication between the devices. The accordingly transmitted data correspond to messages of the users.

The remote device 11 may store the relevant information, for correctly addressing the data to the gateway, in its storage means as illustrated in more detail below with reference to FIGS. 7–10. However, the required information may as well be provided by the public key server 15. Remote devices initially establishing a communication path typically request some kind of public key information about the internal device 13 from the public key server 15. For example, they request the public key of the internal device 13 and/or a corresponding certificate, issued by a trusted third party such as a certification authority, in order to verify the public key of the internal device 13.

An internal device in the internal network may still have and use a world wide IP address, the gateway then forwards such directly addressed information to the corresponding internal device.

In the following, the general structure of the devices illustrated in FIG. 1 is described with respect to FIGS. 2 to 4.

Figure 2:
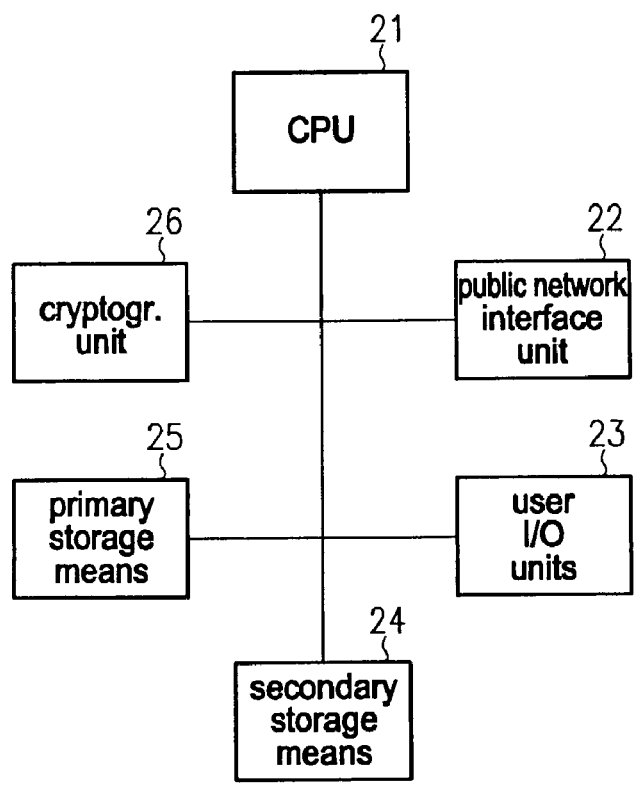
FIG. 2 functional units of a remote device.

FIG. 2 illustrates the basic components of a remote device. The remote device typically comprises a CPU 21, a public network interface unit 22, user input/output units 23, primary storage means 25, secondary storage means 24 as well as an optional cryptographic unit 26. The primary storage means 25 may include RAM, EEPROM and ROM, whereas the secondary storage means may be formed by a hard disk, magnetic disk or optical disk drive.

An operating system and additional software, adapted to control the steps required in a system according the present invention, is stored in the storage means 24,25. Accordingly, a user enters a request for data transmission via the user input/output units 23, which typically comprise monitor, keyboard and mouse. The user request triggers the remote device to transmit data to a device in an internal network via the public network interface unit 22, which connects the remote device to the public network.

The cryptographic unit 26 performs any required encryption, decryption, signature, signature verification or authentication processes. The cryptographic unit 26 may however as well be implemented in software stored in one of the storage means 24, 25. Additionally, the tables illustrated in the FIGS. 7–10 may be stored in the storage means 24, 25. As it will become apparent in more detail from the following, the remote device may request required information such as public keys, certificates and/or the gateway address of the internal device from a public key server.

Figure 3:
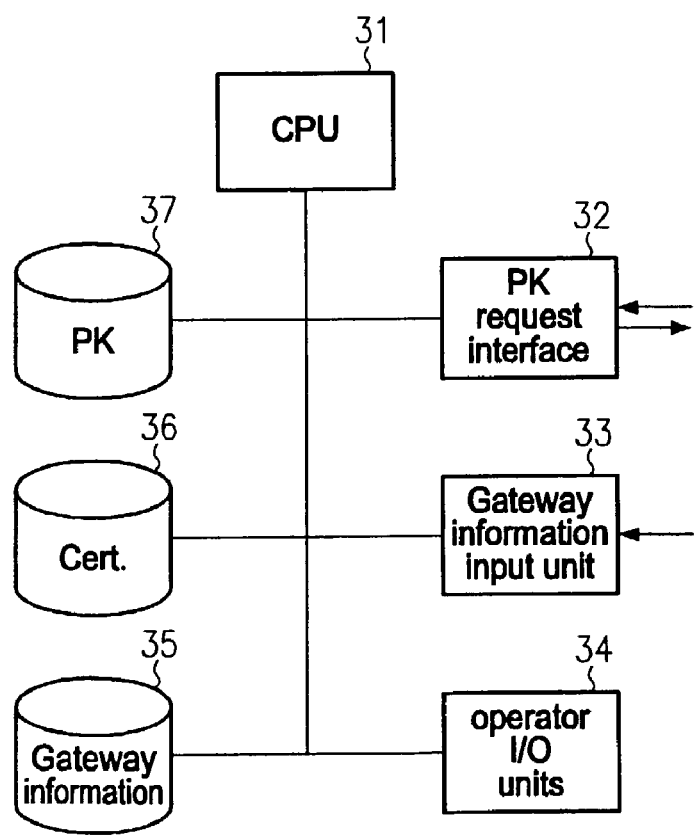
FIG. 3 functional units of a public key information server.

FIG. 3 illustrates components of the public key server 15 illustrated in FIG. 1.

The public key server of FIG. 3 comprises a CPU 31, a public key request interface 32 connected to the internet, a gateway information input unit 33 also connected to the internet, operator input/output units 34 and storage means 37 for public key information.

Preferably, gateway IP addresses, which are intended to be used as a corresponding destination addresses, are stored in a separate gateway information storage means 35. Each gateway IP address is associated with at least one public key of a user or device stored in public key storage means 37. Gateway determination rules as illustrated in FIGS. 9, 10 may also be stored in the gateway information storage means 35. Separately stored gateway IP address information enables a user to flexibly alter or administer the stored information via input through the gateway information input unit 33. Due to separate storage the public key remains unchanged and thus for example a reissue of a corresponding certificate is avoided.

However, the gateway IP address information may as well be included in the stored public key information within the public key storage means 37 or even within a certificate for public keys, such as a X.509 certificate, stored in certificate storage means 36.

Upon request the public key server provides a gateway IP address and optionally even the required public key information to be transmitted for identification of the destination of transmitted data. Requests such as a common request for a public key or a certificate is received via the public key request interface 32. The requested information is identified and transmitted to the requesting party in response to the received request. In response to the common request the gateway IP address is either transmitted together with the requested information or separately. Moreover, the gateway IP address may as well be transmitted upon receiving an explicit request for this information.

Figures 4, 5:
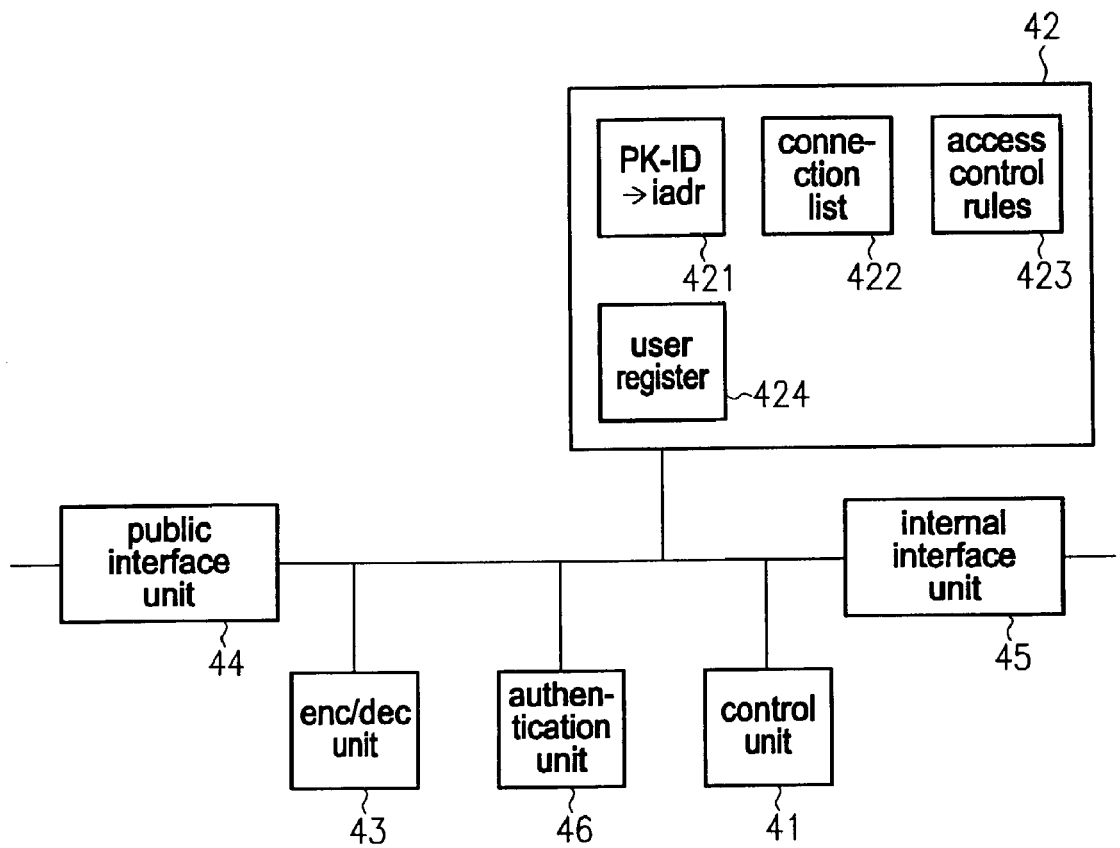
FIG. 4 functional units of a of a gateway.
FIG. 5 a table storing a list of public key identifiers associated to internal addresses.

FIG. 4 illustrates basic components of a gateway according to the invention.

The gateway comprises a public interface port (or unit) 44 connecting the gateway to the internet and an internal interface port (or unit) 45 connecting the gateway to the internal network. Furthermore, a control unit 41 controls the transmission of incoming and/or outgoing data between a remote device of the public network and an internal device in the internal network. Storage means 42 store a list 421 of public key identifiers and respectively associated internal network addresses of internal devices.

The control unit 41 identifies the destination of incoming data, which are addressed to the public network address of the gateway, by referring to the stored list 421 based on public key information included in the incoming data. Thereby the internal network address of the destination is determined.

Furthermore, the gateway illustrated in FIG. 4 comprises an encryption/decryption unit 43 and an authentication unit 46. The encryption/decryption unit 43 enables the gateway to decrypt received incoming data completely or partially, and to encrypt outgoing data accordingly. The authentication unit 46 enables the gateway to approve authenticity of transmitted data, public keys and/or certificates and to provide gateway authentication data indicating authenticity of data, public keys and/or certificates of the gateway. As not illustrated in FIG. 4, storage means 42 may additionally store public keys of third parties such as remote devices.

The data may be transmitted via the public network in one of the following modes: encrypted with the public keys of the gateway and the internal device, encrypted with the public key of the gateway or the internal device or even unencrypted. If preferred, the public key information identifying the destination of the transmitted data may be encrypted with the public key of the gateway to hide even the identity of the recipient within the public network. The data transmitted to the gateway for example comprise the public key information or identifier, control data required for transmission in the public network and message data as intended to be send to the user or device.

The storage means 42 also store a connection list 422, access control rules 423 and a user register 424. An existing or newly-established connection between the remote device and the internal device is stored in the connection list 422, which will be described in more detail below with reference to FIG. 6.

The user register 424 holds a list of users presently connected to the internal network or users having actively registered or unregistered with the gateway. Hence, a user may register with the gateway when arriving at his office in the morning and unregister when leaving for lunch. The list of public key identifiers and associated internal network addresses may comprise an alternative internal address for forwarding transmitted data for the user, which is used in case he is currently not registered with the internal network. The alternative internal address could for example be the internal address of his colleague or a voicemail-box.

The access control rules 423 stored in the storage means 42 of the gateway comprise rules with regard to which type of connections may be established or even denied, for example, depending on the type of connection, the sending or the receiving party. According to one rule a ftp-server may for example receive data to be stored on the ftp-server from any remote user. Additionally, the gateway may for example only establish connections for predefined users, predefined destinations or after authentication of remote devices only. Moreover, the access rules may define whether the data has to be transmitted in an encrypted or unencrypted mode within the internal network, on its way to a specific destination or within the public network.

Since the gateway not only knows the recipient of the data, but may as well check the type of connection to be established or used and the identity of the sender, flexible access control rules can be defined for controlling the establishment and provision of connections. In particular, it can be avoided that the remote device achieves unlimited access to the internal network or access to any internal information.

Moreover, the gateway may be adapted to communicate with a further gateway according to the present invention. For example, if the remote device is arranged in a further internal network comprising such a gateway, the gateway of the internal device may request the public key information including the remote device's gateway IP address from the public key server 15.

In the following, structure and purpose of data stored in the devices illustrated in FIG. 1 are described with respect to FIGS. 5 to 10.

FIG. 5 illustrates an example for a list of public key identifiers 52 and associated internal addresses 53 as stored in the gateway. A column 51 identifying a respective user is additionally stored together with the relevant information. Accordingly, the user Alpha is connected to the internal network of the gateway and may be addressed via the internal network address iadr_A. Moreover, the public key of the user Alpha can be identified by means of the unique public key identifier A_ID. It should be noted that for example the user Gamma may correspond to a hardware unit such as an ftp-server having its own public key and being connected to the internal network. Moreover, one user may have more than one internal address assigned in the internal network. Depending on the type of data to be transmitted, which corresponds to the type of connection, the different addresses may for example refer to the user's computer, (IP based) telephone, fax or ftp-server.

A list of existing connections of the gateway, as illustrated in FIG. 6, stores an identifier for the remote device 62, the internal address 63 of the internal device as well as, for example, a temporary assigned port 61 of the connection from the plurality of internal ports of the gateway. Additional information about the connection such as the time of the last received or transmitted data packet or the type of connection may further be stored in this table.

The tables illustrated in FIGS. 7–10 may be stored in the remote device 11 and/or the public key server 15 illustrated in FIG. 1.

A list of user identifiers 71 and associated public key Identifiers 72, as illustrated in FIG. 7, may additionally be stored in the gateway 12 of FIG. 1. In the list user Alpha is identified to have the public key with the public key identifier A_ID.

Furthermore, as illustrated in FIG. 8, the gateway information comprises a gateway identifier 81, a gateway IP address 82 and an optional data field 83 for the public key of the gateway.

Moreover, the table illustrated in FIG. 9 stores a user identifier 91 and a gateway identifier 93. These data fields may be mapped to the user identifier 71 of FIG. 7 and the gateway identifier 81 of FIG. 8. Besides providing the reference between user identifiers and gateway identifiers, in the example illustrated in FIG. 9, the table stores different gateway identifiers associated to one user. The user Alpha depending on the value of a case identifier 92 is associated to one of gateway identifiers G1–G3.

As shown in FIG. 10, a corresponding list defining the different cases stores a case identifier 96 associated to a user identifier 94 or defined as a default case independently of a user identifier. The column determination rule 95 indicates how to determine whether one of the cases is fulfilled. In this example the public key server 15 or the client 11 are assumed to check the cases in the order of the case values. Hence, on Saturdays and Sundays the public key server receiving a request for public key information for the user Alpha provides the gateway IP address IP_adr_G1 as a destination address of data to be transmitted to the user Alpha. According to the first line of determination Rule 95 for the user Alpha case number one is identified as the relevant case. Hence, for case number one and user Alpha the gateway identifier G1 is identified in column 93 of FIG. 9. Finally, the corresponding gateway IP address is derived by the table illustrated in FIG. 8.

Accordingly, the second line in the table illustrated in FIG. 10 defines that, if the sender is a member of the company of the user Alpha, the gateway IP address of gateway G2 has to be used. The third line in FIG. 10 represents a default case for the user Alpha indicating to use Gateway G3 in all other situations not previously covered.

As obvious from the above, a system according to the present invention may be formed by any combination of units 11, 12 and 15 illustrated in FIG. 1. Hence, multiple gateways may exist and for example the remote device may be arranged in an internal network of a second gateway. However, the system preferably only comprises a single public key server or server network in order to provide the public key information and the gateway IP addresses of the destinations via one source only.

The internal network may be split into an extra-net part and an intra-net part. The extra-net part of the network has world wide IP addresses assigned and is connected to the public network. The intra-net part operates on internal IP addresses, wherein the gateway is arranged between the extra-net part and the intra-net part.

While the invention has been described with respect to the preferred physical embodiments constructed in accordance therewith, it will be apparent to those skilled in the art that various modifications, variations and improvements of the present invention may be made in the light of the above teachings and within the preview of the appended claims without departing from the spirit and intended scope of the invention. In addition, those areas in which it is believed that those of ordinary skilled in the art are familiar, have not been described herein in order to not unnecessarily obscure the invention described herein. Accordingly, it is to be understood that the invention is not to be limited by the specific illustrative embodiments, but only in the scope of the appended claims.

The invention claimed is:

1. A gateway for connecting a public network to an internal network, the gateway comprising:
   a control unit for controlling transmission of incoming and/or outgoing data between a remote device in the public network and an internal device in the internal network;
   a public port connected to the public network and having at least one public network address; and
   an internal port connected to the internal network; and
   a storage unit storing a list of public key identifiers and respectively associated internal network addresses of internal devices,
   wherein the control unit uses public key information included in an incoming data message sent to the public port and the list of public key identifiers stored in the storage unit and respectively associated internal network addresses of internal devices to determine a destination internal network address of a destination internal device, the control unit directing incoming data to the destination internal device with the determined destination internal network address.

2. The gateway according to claim 1, wherein the public key information in the incoming data includes the public key identifier.

3. The gateway according to claim 1, further comprising:
an encryption/decryption unit for decrypting the incoming data and/or encrypting the outgoing data.

4. The gateway according to claim 1, further comprising:
an authentication unit for verifying the authenticity of transmitted data, the internal device, the remote device and/or used keys.

5. The gateway according to claim 1, wherein the control unit is adapted to provide a connection path for a two-way communication between the remote device and the internal device.

6. The gateway according to claim 1, further comprising:
an access control unit for determining whether the incoming or the outgoing data may be transmitted according to predefined access control rules.

7. The gateway according to claim 2, further comprising:
an encryption/decryption unit for decrypting the incoming data and/or encrypting the outgoing data;
an authentication unit for verifying the authenticity of transmitted data, the internal device, the remote device and/or used keys; and
an access control unit for determining whether the incoming or the outgoing data may be transmitted according to predefined access control rules.

8. The gateway according to claim 2, further comprising:
an authentication unit for verifying the authenticity of transmitted data, the internal device, the remote device and/or used keys.

9. The gateway according to claim 2, wherein the control unit is adapted to provide a connection path for a two-way communication between the remote device and the internal device.

10. The gateway according to claim 2, further comprising:
an access control unit for determining whether the incoming or the outgoing data may be transmitted according to predefined access control rules.

11. A system, comprising
a gateway for connecting a public network to an internal network, the gateway comprising:
a control unit for controlling transmission of incoming and/or outgoing data between a remote device in the public network and an internal device in the internal network;
a public port connected to the public network and having at least one public network address; and
an internal port connected to the internal network;
a storage unit storing a list of public key identifiers and respectively associated internal network addresses of internal devices, wherein the control unit uses public key information included in an incoming data message sent to the public port and the list of public key identifiers stored in the storage unit and respectively associated internal network addresses of internal devices to determine a destination internal network address of a destination internal device, the control unit directing incoming data to the destination internal device with the determined destination internal network address; and
a remote device addressing data intended for an internal device of the internal network of the gateway to the public network address of the gateway.

12. The system according to claim 11, wherein the remote device stores a plurality of gateway addresses for the destination and selects the public network address of the gateway from the list of gateway addresses in accordance with predefined first gateway determination rules.

13. The system according to claim 11, further comprising:
a public key information server providing the public network address of the destination's gateway as a destination address upon request.

14. The system according to claim 13, wherein the public key information server stores a plurality of gateway addresses for at least one destination and selects the public network address of the gateway from the list of gateway addresses in accordance with second predefined rules.

15. A method for transmitting incoming and/or outgoing data between a remote device in a public network and an internal device in an internal network, the method performed in a gateway of the internal device comprising:
transmitting the data between the remote device and the gateway of the internal device using a public address of the gateway;
storing a list of public key identifiers and associated internal network addresses;
identifying a destination of the incoming data, which are addressed to the public network address of the gateway, by determining an internal network address of the internal device based on the public key information included in the incoming data and the stored list of public key identifiers and associated internal network addresses; and
forwarding the incoming data to the internal network address of the destination identified in said identifying step.

16. A system, comprising
a gateway for connecting a public network to an internal network, the gateway including:
a control unit for controlling transmission of incoming and/or outgoing data between a remote device in the public network and an internal device in the internal network,
a public port connected to the public network and having at least one public network address, and
an internal port connected to the internal network;
a storage unit storing a list of public key identifiers and respectively associated internal network addresses of internal devices, wherein the control unit uses public key information included in an incoming data message sent to the public port and the list of public key identifiers stored in the storage unit and respectively associated internal network addresses of internal devices to determine a destination internal network address of a destination internal device, the control unit directing incoming data to the destination internal device with the determined destination internal network address, the public key information in the incoming data including the public key identifier; and
a remote device addressing data intended for an internal device of the internal network of the gateway to the public network address of the gateway.

17. A system, comprising
a gateway for connecting a public network to an internal network, the gateway including:
a control unit for controlling transmission of incoming and/or outgoing data between a remote device in the public network and an internal device in the internal network,
a public port connected to the public network and having at least one public network address, and
an internal port connected to the internal network;

a storage unit storing a list of public key identifiers and respectively associated internal network addresses of internal devices, wherein the control unit uses public key information included in an incoming data message sent to the public port and the list of public key identifiers stored in the storage unit and respectively associated internal network addresses of internal devices to determine a destination internal network address of a destination internal device, the control unit directing incoming data to the destination internal device with the determined destination internal network address, the public key information in the incoming data including the public key identifier;

an access control unit for determining whether the incoming or the outgoing data may be transmitted according to predefined access control rules; and a remote device addressing data intended for an internal device of the internal network of the gateway to the public network address of the gateway.

18. The system according to claim 17, further comprising:
a public key information server providing the public network address of the destination's gateway as a destination address upon request.

19. The gateway according to claim 17, wherein the public key information in the incoming data allows to determine the public key identifier.

20. A computer readable storage medium holding computer executable instructions for performing a process comprising the steps of:

transmitting the data between the remote device and the gateway of the internal device using a public address of the gateway;

storing a list of public key identifiers and associated internal network addresses;

identifying a destination of the incoming data, which are addressed to the public network address of the gateway, by determining an internal network address of the internal device based on the public key information included in the incoming data and the stored list of public key identifiers and associated internal network addresses; and forwarding the incoming data to the internal network address of the destination identified in said identifying step.

21. A system for transmitting incoming and/or outgoing data between a remote device in a public network and an internal device in an internal network, comprising:

means for transmitting the data between the remote device and the gateway of the internal device using a public address of the gateway;

means for storing a list of public key identifiers and associated internal network addresses; and means for identifying a destination of the incoming data, which are addressed to the public network address of the gateway, by determining an internal network address of the internal device based on the public key information included in the incoming data and the stored list of public key identifiers and associated internal network addresses; and means for forwarding the incoming data to the internal network address of the destination identified in said identifying step.

22. The system of claim 21, wherein said means for transmitting, said means for forwarding, said means for storing and said means for identifying comprise devices of a computer system.

23. The system of claim 21, wherein said means for transmitting, said means for forwarding, said means for storing and said means for identifying comprise computer readable instructions recorded on a computer readable medium.

* * * * *